United States Patent
Maucec et al.

(10) Patent No.: US 12,189,072 B2
(45) Date of Patent: Jan. 7, 2025

(54) SYSTEM AND METHOD TO IDENTIFY HIGH-IMPACT DISCRETE FRACTURE MODEL REALIZATIONS FOR ACCELERATED CALIBRATION OF RESERVOIR SIMULATION MODELS

(71) Applicant: Saudi Arabian Oil Company, Dhahran (SA)

(72) Inventors: Marko Maucec, Englewood, CO (US); Otto E. Meza Camargo, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 704 days.

(21) Appl. No.: 17/063,227

(22) Filed: Oct. 5, 2020

(65) Prior Publication Data

US 2022/0107433 A1 Apr. 7, 2022

(51) Int. Cl.
*G01V 1/28* (2006.01)
*G01V 1/30* (2006.01)
(Continued)

(52) U.S. Cl.
CPC .............. *G01V 1/282* (2013.01); *G01V 1/302* (2013.01); *G01V 1/308* (2013.01); *G01V 11/00* (2013.01);
(Continued)

(58) Field of Classification Search
CPC ........ G01V 1/282; G01V 1/302; G01V 1/308; G01V 11/00; G01V 20/00; G01V 99/005;
(Continued)

(56) References Cited

U.S. PATENT DOCUMENTS

| | | |
|---|---|---|
| 8,274,859 B2 | 9/2012 | Maucec |
| 8,392,165 B2 | 3/2013 | Maucec et al. |

(Continued)

FOREIGN PATENT DOCUMENTS

WO  WO 2018151707  8/2018

OTHER PUBLICATIONS

Somogyvári, Márk, et al. "Synthetic fracture network characterization with transdimensional inversion." Water Resources Research 53.6 (2017). pp. 5104-5123. (Year: 2017).*

(Continued)

*Primary Examiner* — John E Johansen
(74) *Attorney, Agent, or Firm* — Fish & Richardson P.C.

(57) ABSTRACT

The present disclosure describes a computer-implemented method that includes: receiving a seismic dataset of a surveyed subsurface of a reservoir, the seismic dataset comprising observed pressure and production data of the reservoir as well as a set of geological and geo-mechanical parameters representing physical features of the surveyed subsurface; generating multiple realizations of a discrete fracture network (DFN) based on a subset of the set of geological and geo-mechanical parameters; selecting, from the multiple realizations, one or more realizations based on a parameter with a value under a 10% quantile of a full range of likely values; performing a forward simulation for the reservoir based on the selected one or more realizations and the observed pressure and production data; determining that a misfit of the forward simulation is below a threshold based on evaluating an objective function; and producing a model of the reservoir based on the forward simulation.

18 Claims, 10 Drawing Sheets

(51) Int. Cl.
    *G01V 11/00*     (2006.01)
    *G01V 20/00*     (2024.01)
    *G06F 18/2113*   (2023.01)
    *G06F 30/20*     (2020.01)
    *G06F 113/08*    (2020.01)

(52) U.S. Cl.
    CPC .......... *G01V 20/00* (2024.01); *G06F 18/2113* (2023.01); *G06F 30/20* (2020.01); *G01V 2210/1234* (2013.01); *G01V 2210/6122* (2013.01); *G01V 2210/646* (2013.01); *G01V 2210/663* (2013.01); *G01V 2210/665* (2013.01); *G06F 2113/08* (2020.01)

(58) Field of Classification Search
    CPC ... G01V 2210/1234; G01V 2210/6122; G01V 2210/646; G01V 2210/663; G01V 2210/665; G06F 30/20; G06F 2113/08; G06K 9/623
    USPC ........................................................ 703/9, 10
    See application file for complete search history.

(56) References Cited

U.S. PATENT DOCUMENTS

| | | |
|---|---|---|
| 8,507,868 B2 | 8/2013 | Maucec |
| 8,619,499 B2 | 12/2013 | Maucec |
| 8,920,029 B2 | 12/2014 | Maucec |
| 9,026,416 B2 | 5/2015 | Mallison et al. |
| 9,069,916 B2 | 6/2015 | Sarma et al. |
| 9,081,918 B2 | 7/2015 | Yarus et al. |
| 9,157,319 B2 | 10/2015 | Yarus et al. |
| 9,208,268 B2 | 12/2015 | Fung |
| 9,223,042 B2 | 12/2015 | Maucec et al. |
| 9,260,948 B2 | 2/2016 | Maucec |
| 9,330,064 B2 | 5/2016 | Maucec |
| 9,646,414 B2 | 5/2017 | Maucec |
| 9,732,592 B2 | 8/2017 | Carvajal et al. |
| 9,753,181 B2 | 9/2017 | Gorell et al. |
| 9,779,060 B2 | 10/2017 | Maucec |
| 9,898,560 B2 | 2/2018 | Hinkley et al. |
| 9,952,351 B2 | 4/2018 | Kuznetsov et al. |
| 10,108,762 B2 | 10/2018 | Feger et al. |
| 2009/0235729 A1* | 9/2009 | Barthelemy ............ G01V 1/50 73/152.05 |
| 2010/0076738 A1 | 3/2010 | Dean et al. |
| 2010/0138196 A1 | 6/2010 | Hui et al. |
| 2010/0312529 A1 | 12/2010 | Souche et al. |
| 2011/0257944 A1 | 10/2011 | Du et al. |
| 2012/0232865 A1 | 9/2012 | Maucec et al. |
| 2015/0032431 A1 | 1/2015 | Shi et al. |
| 2015/0039276 A1 | 2/2015 | Maucec |
| 2015/0286950 A1 | 10/2015 | Kang |
| 2015/0286954 A1 | 10/2015 | Maucec et al. |
| 2016/0004800 A1 | 1/2016 | Singh et al. |
| 2016/0047943 A1 | 2/2016 | Maucec et al. |
| 2016/0131801 A1 | 5/2016 | Singh et al. |
| 2016/0138371 A1 | 5/2016 | Loaiza et al. |
| 2016/0139298 A1 | 5/2016 | Singh et al. |
| 2016/0168959 A1 | 6/2016 | Yarus et al. |
| 2016/0170087 A1 | 6/2016 | Yarus et al. |
| 2016/0187533 A1 | 6/2016 | Maucec et al. |
| 2016/0259088 A1 | 9/2016 | Carvajal et al. |
| 2016/0312607 A1 | 10/2016 | McNealy et al. |
| 2016/0326845 A1 | 11/2016 | Djikpesse et al. |
| 2017/0003694 A1 | 1/2017 | Carvajal et al. |
| 2017/0275970 A1 | 9/2017 | Crawford et al. |
| 2020/0095858 A1* | 3/2020 | Bouaouaja ............ G01V 1/46 |
| 2020/0292722 A1 | 9/2020 | Maucec et al. |

OTHER PUBLICATIONS

Jung, Andre, Darryl H. Fenwick, and Jef Caers. "Training image-based scenario modeling of fractured reservoirs for flow uncertainty quantification." Computational Geosciences 17 (2013). pp. 1015-1031. (Year: 2013).*

Jung, Seungpil, et al. "Ensemble-based data assimilation in reservoir characterization: A review." Energies 11.2 (2018). pp. 1-23. (Year: 2018).*

Kayode, Babatope, et al. "Forward Integration of Dynamic Data into 3-D Static Modeling Significantly Improves Reservoir Characterization." International Petroleum Technology Conference. OnePetro, 2019. p. 1-12 (Year: 2019).*

Chen et al., "Selecting representative models from large set of models," SPE-163671-MS, presented at SPE Reservoir Simulation Symposium, The Woodlands, Texas, Feb. 18-20, 2013, 13 pages.

Fox et al., "Statistical geological discrete fracture network model," Technical Report, SKB, Nov. 2007, 406 pages.

Friedmann et al., "Assessing uncertainty in channelized reservoirs using experimental designs," presented at the SPE Annual Technical conference and exhibition, New Orleans, Louisiana, Sep. 30, 2001; Society of Petroleum Engineers, 2001, 15 pages.

Jamshidnezhad, "Experimental Design in Reservoir Engineering," Experimental Design in Petroleum Reservoir Studies, 2015, 42 pages.

Kassenov et al., "Efficient workflow for assisted history matching and brownfield design of experiments for the tengiz field," SPE-172329, presented at the SPE Annual Caspian Technical Conference and Exhibition, Astana, Kazakhstan, Nov. 12-14, 2014; Society of Petroleum Engineers, 2014, 11 pages.

Maucec et al., "Engineering Workflow for Probabilistic Assisted History Matching and Production Forecasting: Application to a Middle East carbonate Reservoir," SPE-165980-MS, Society of Petroleum Engineers, Sep. 2013, 21 pages.

Oliver et al. "Recent progress on reservoir history matching: a review," Connput Geosci., 2011, 15:185-221.

Sarma et al., "New Transfer Functions for Simulation of naturally Fractured Reservoirs with Dual-Porosity Models," SPE 90231-PA, Society of Petroleum Engineer Journal, Sep. 2006, 16 pages.

Schulze-Riegert and Ghedan, "Modern Techniques for History Matching," presented at the 9th International Forum on Reservoir Simulations, Dec. 9-13, 2007, 50 pages.

Schulze-Riegert et al., "Scalability and Performance Efficiency of History Matching Workflows Using MCMC and Adjoint Techniques Applied to the North Sear reservoir Study," SPE-180105-MS, Society of Petroleum Engineers, May 31, 2016, 20 pages.

Sun, "Characterization and simulation of discrete fracture networks in unconventional shale reservoirs," Texas A&M University, Dissertation submitted to the Office of Graduate and Professional Studies, Aug. 2016, 232 pages.

Jung et al., "Ensemble-based data assimilation in reservoir characterization: a review," Feb. 2018, 11(2):13-17, 5 pages.

Marko et al., "New approach to history matching of simulation models with discrete fracture networks," International Petroleum Technology Conference, Jan. 2020, 19 pages.

Sun et al., "An integrated workflow for characterization and simulation of complex fracture networks utilizing microseismic and horizontal core data," Journal of Natural Gas Science and Engineering, Aug. 2016, 34:1347-1360, 14 pages.

PCT International Search Report and Written Opinion in International Appln. No. PCT/US2021/053360, dated Jan. 25, 2022, 16 pages.

* cited by examiner

SYSTEM AND METHOD TO IDENTIFY HIGH-IMPACT DISCRETE FRACTURE MODEL REALIZATIONS FOR ACCELERATED CALIBRATION OF RESERVOIR SIMULATION MODELS

TECHNICAL FIELD

This disclosure generally relates to methods, systems, and apparatus for improving the exploration for hydrocarbons.

BACKGROUND

Hydrocarbons, such as oil and gas, occur in the Earth's subsurface at a depth ranging from a few hundred meters to several kilometers and are found in geological formations, which are layers of rock. As such, prospecting for hydrocarbons includes the difficult tasks of identification of where such geological formations exist and extraction of the hydrocarbons from these geological formations at such depths. Identifying the location of hydrocarbons may include the conducting of geological surveys collected through, for example, seismic prospecting. These geological surveys can be employed to construct geological maps representing the structure of areas of the outer crust of the Earth.

SUMMARY

In one aspect, the present disclosure describes a computer-implemented method comprising: receiving a seismic dataset of a surveyed subsurface of a reservoir under investigation, the seismic dataset comprising observed pressure and production data of the reservoir as well as a set of geological and geo-mechanical parameters representing physical features of the surveyed subsurface; generating multiple realizations of a discrete fracture network (DFN) based on a subset of the set of geological and geo-mechanical parameters; selecting, from the multiple realizations, one or more realizations that have been generated, at least in part, based on a parameter with a parameter value under a 10% quantile of a full range of likely values of the parameter; performing a forward simulation for the reservoir based on the selected one or more realizations and the observed pressure and production data; determining that a misfit of the forward simulation is below a threshold based on evaluating an objective function; and producing a 3D model of the reservoir based on the forward simulation.

Implementations may include one or more of the following features.

The method may further include: performing production forecasting for the reservoir based, at least in part, on the 3D model. The objective function may be configured to reduce a misfit of watercut and pressure. The objective function may be further configured to reduce a misfit for water rate and water production.

The set of geological and geo-mechanical parameters may include: fracture orientation, fracture geometric properties and constraints, fracture density or concentration, spatial components of paleo-stress, intrinsic fracture permeability model. The set of geological and geo-mechanical parameters may include: fracture density and fracture permeability. Fracture orientation may include variogram attributes including major, minor and vertical correlation length.

The method may further include: in response to determining that the misfit of the forward simulation is not below the threshold, selecting a new realization that has been generated, at least in part, based on a parameter with a parameter value under a 10% quantile of the full range of likely values of the parameter; and performing the forward simulation for the reservoir based on the selected new realization and the observed pressure and production data. The method may further include: redefining the objective function based on the selected new realization. The method may further include: generating a plurality of history matched models based on iteratively selecting the realization of the DFN; and ranking the plurality of history matched models based on misfits determined from the objective functions respectively associated with each of the history matched models.

In another aspect, the present disclosure describes a computer system comprising: one or more processors configured to perform operations of: receiving a seismic dataset of a surveyed subsurface of a reservoir under investigation, the seismic dataset comprising observed pressure and production data of the reservoir as well as a set of geological and geo-mechanical parameters representing physical features of the surveyed subsurface; generating multiple realizations of a discrete fracture network (DFN) based on a subset of the set of geological and geo-mechanical parameters; selecting, from the multiple realizations, one or more realizations that have been generated, at least in part, based on a parameter with a parameter value under a 10% quantile of a full range of likely values of the parameter; performing a forward simulation for the reservoir based on the selected one or more realizations and the observed pressure and production data; determining that a misfit of the forward simulation is below a threshold based on evaluating an objective function; and producing a 3D model of the reservoir based on the forward simulation.

Implementations may include one or more of the following features.

The operations may further include: performing production forecasting for the reservoir based, at least in part, on the 3D model. The objective function may be configured to reduce a misfit of watercut and pressure. The objective function may be further configured to reduce a misfit for water rate and water production.

The set of geological and geo-mechanical parameters may include: fracture orientation, fracture geometric properties and constraints, fracture density or concentration, spatial components of paleo-stress, intrinsic fracture permeability model. The set of geological and geo-mechanical parameters may include: fracture density and fracture permeability. Fracture orientation may include variogram attributes including major, minor and vertical correlation length.

The operations may further include: in response to determining that the misfit of the forward simulation is not below the threshold, selecting a new realization that has been generated, at least in part, based on a parameter with a parameter value under a 10% quantile of the full range of likely values of the parameter; and performing the forward simulation for the reservoir based on the selected new realization and the observed pressure and production data. The operations may further include: redefining the objective function based on the selected new realization. The operations may further include: generating a plurality of history matched models based on iteratively selecting the realization of the DFN; and ranking the plurality of history matched models based on misfits determined from the objective functions respectively associated with each of the history matched models.

Implementations according to the present disclosure may be realized in computer implemented methods, hardware computing systems, and tangible computer readable media.

For example, a system of one or more computers can be configured to perform particular actions by virtue of having software, firmware, hardware, or a combination of them installed on the system that in operation causes or cause the system to perform the actions. One or more computer programs can be configured to perform particular actions by virtue of including instructions that, when executed by data processing apparatus, cause the apparatus to perform the actions.

The details of one or more implementations of the subject matter of this specification are set forth in the description, the claims, and the accompanying drawings. Other features, aspects, and advantages of the subject matter will become apparent from the description, the claims, and the accompanying drawings.

DESCRIPTION OF DRAWINGS

Like reference numbers and designations in the various drawings indicate like elements.

DETAILED DESCRIPTION

Figure 1:
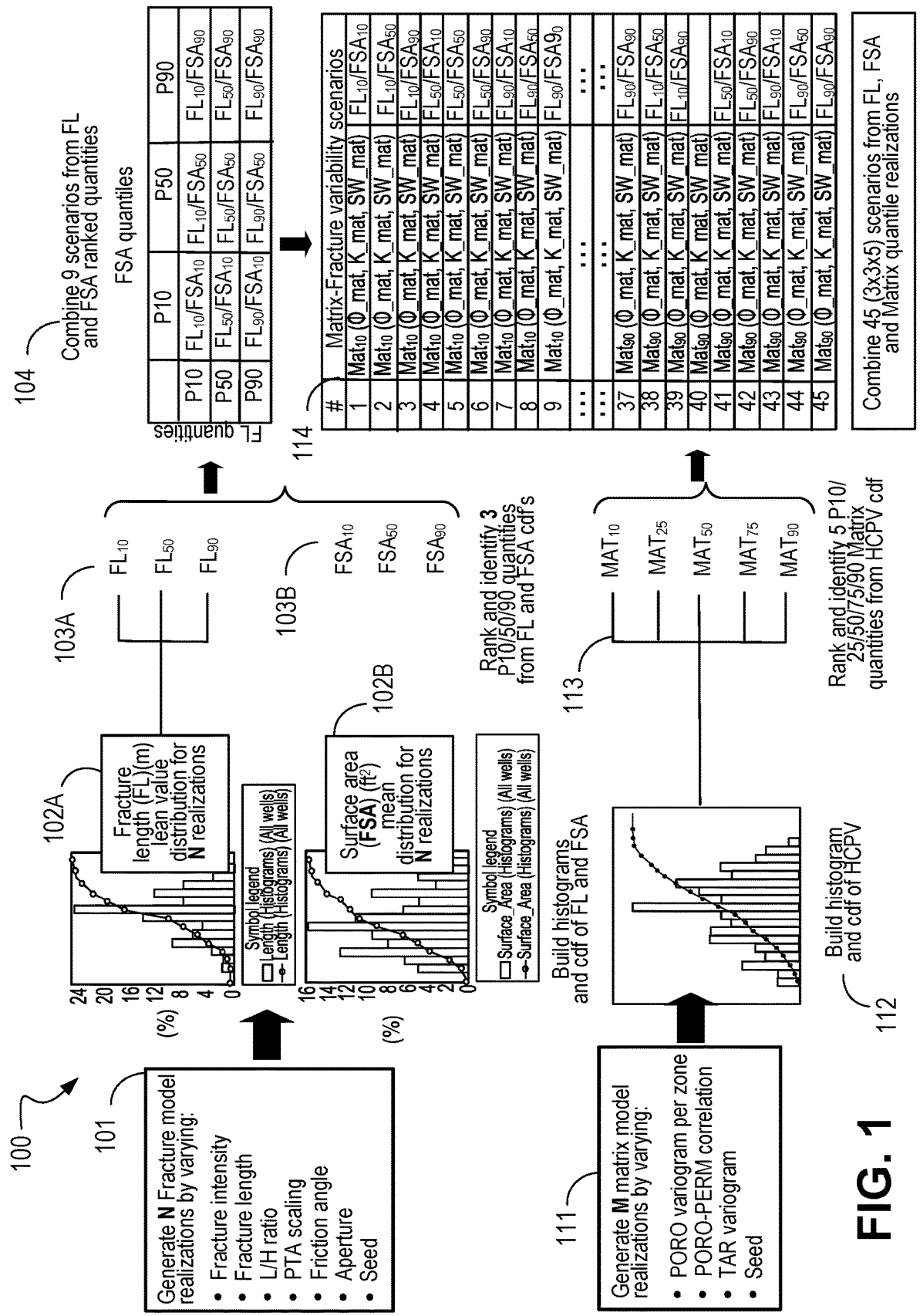
FIG. 1 illustrates an example of a diagram for identifying and ranking high-impact discrete fracture network (DFN) realizations according to an implementation of the present disclosure.

The present disclosure describes a process for probabilistic ranking and identification of fracture models, more specifically discrete fracture network (DFN) realizations for natural fractures reservoirs (carbonate or sandstone reservoir). The disclosed methodology can predict the natural fractures based on paleo-stress evolution model, in-situ stress regime, seismic data, critical stress analysis and calibration with dynamic data. such as pressure transient and production log tests, analyzed at full-field reservoir scale. Some implementations can produce a full spectrum of realizations of natural fracture networks based on the geological/geo-mechanical parameters definitions such as:
 (1) fracture orientation (e.g. via variogram attributes—major, minor and vertical correlation length),
 (2) fracture geometric properties and constraints (e.g. fracture median length, length/height ratio, minimum fracture length or maximum length of implicit fractures),
 (3) fracture density or concentration (i.e. critical vs. non-critical fracture density realizations through conditioning with friction angle),
 (4) spatial (3D angular) components of paleo-stress, and
 (5) intrinsic fracture permeability model (e.g. fracture aperture normalization and conductivity (KH) calibration).

The proposed process can allow a simulation model to identify more impactful attributes such as fracture density and/or concentration and fracture permeability/conductivity and, as a result, establish the correlation and root-cause relationship of these more impactful parameters in the dynamic response of such parameterized model. In this context of analyzing natural fractures variable for reservoir data, conventional statistical and probability sampling techniques tend to focus on quantifying model and parameter uncertainty within P10 and P90 quantiles of cumulative distribution function (cdf). By integrating rigorous stochastic sampling and parameterization of DFN attributes listed in the five aforementioned factors, implementations described in the present disclosure opens up exploring the low probability domain (below P10) and identifying low-probability but high-impact stochastic DFN realizations that significantly affect the dynamic behavior of the reservoir simulation model.

Some implementations leverage the parameters of fracture density and fracture permeability that represent the more impactful parameters to control fluid propagation in dual porosity—dual permeability (DPDP) in reservoir modelling. The implementations thus reconciles the differences between explicit (e.g., via DFN) and implicit (e.g., via simulation model) parameterization of fracture density that can significantly impact fracture-dominated reservoir connectivity and as such fluid dynamics (e.g. water breakthrough and fractional flow amplitude).

Numerous differentiating advantages can result from the implementations of the present disclosure. For example, percentile/quantile definitions (i.e. including extreme P-values for P<10) for all the natural fracture variables are parametrized in the implementations based on the expected geological variability. The unique focus can enforce that friction angle is within a certain physical range of values, which can yield a better control over generated representations of fracture density.

Moreover, implementations can integrate dynamic calibration process where, for example, flow capacity values from the well test experiments are involved in order to minimize the error between the predicted flow capacity model and observed flow capacity point at well level. This integration renders more accurate definition of sampled probabilistic percentiles/quantiles (i.e. including extreme P-values for P<10) and dynamic simulation model ranking.

Further, implementations can identify more geologically consistent and accurate realization of the initial basecase geological (i.e. including DFN realizations sampled from extreme P-values for P<10) model for more efficient dynamic calibration and reconciliation, which can demonstratively generate dynamic responses with minimized misfit between observed and simulated field watercut and pressure data. Such improvement can lead to a dynamically calibrated model with higher accuracy and geological consistency, an accelerated history-matching process, as well as a simulation model that results in more robust and reliable predictability for production forecasting.

For context, the present disclosure describes improvements to reservoir modelling, a process of creating a three-dimensional representation of a given reservoir based on its petrophysical, geological and geophysical properties. These properties can be defined during reservoir characterization where physical and chemical data may be assembled to extrapolate those values throughout the reservoir. After a three-dimensional model is created for reservoir simulation, real time field data, for example, survey data and seismic data can be provided to drive the model to predict the behavior of the reservoir. This is useful for making field development decisions, such as drilling additional wells and estimating reserves. The physical space of the model is represented by a matrix of discrete, three-dimensional cells. These cells are discrete because they have known and definable boundaries from core and/or well log data.

In more detail, to extract hydrocarbons contained in a geological reservoir, a geological formation is expected to have sufficient porosity and permeability. Porosity includes the fraction of the bulk volume of rock that is not rock (for example, the spaces in between grains). Porosity may range from a few percent to more than 30 percent. Hydrocarbon formations may also contain water in the pore spaces, which may or may not flow along with the hydrocarbon. Permeability includes a measure of how easily fluids flow through a porous rock, which may vary dramatically by layer. Geological models, for example, can be employed to capture the spatial variability in porosity, permeability, and water and hydrocarbon saturations.

Moreover, a geological formation can include more complexities such as meandering river channels and streams, carbonate reefs, beaches, dunes and the jumbled mix of sands and shales that characterize turbidities. Additionally, complex faults, salt domes and other features further complicate the subterranean environment.

Seismic surveys, well logs, cores, and so forth may be employed to generate 3D reservoir models that map subsurface formations. For example, a geo-cellular model may use grids to construct a static model of a reservoir. These grids may include information regarding the petrophysical, geological, geophysical, fluid, and rock depicted as spatially distributed throughout the respective reservoir. For example, a geo-cellular model may include a vertical cell size of one to two feet. Such a model can be constructed by kriging the well logs into the space using a deterministic or a stochastic approach. For additional context, Kriging includes a method of interpolation for which the interpolated values are modeled by a Gaussian process governed by prior covariances, as opposed to a piecewise-polynomial spline chosen to optimize smoothness of the fitted values. In some implementations, a seismic driven rock property (for example, porosity) can be integrated into a geo-cellular model as seismic driven rock properties have more spatial coverage as compared to wells. A correlation can be made between the integrated seismic property and a log property. Such log properties may be obtained via well logging, also known as wireline logging. Well logging includes the collection of data (log properties) in the borehole environment. The collected log properties may enable, for example, the determination of subsurface physical properties and reservoir parameters. In general, well logs respond to variations in rock matrix and pore fluid composition. An example correlation made between the integrated seismic property and a log property, may include determining a correlation value to weight the seismic property as a soft constraint in the geo-cellular model. In some implementations, such a model may include large imperfections (for example, a positive correlation where, in some layers, the properties correlate negatively) as the resolutions of seismic properties and well log are not the same. Thus comparing these data points directly can results in poor correlation.

Geo-cellular models may be input to a dynamic model, which can be employed for reservoir simulations. For example, in a reservoir simulator, fluid flow and material balance equations may be solved for each of the grids within the geo-cellular model to predict reservoir behavior under various alternatives. In particular, these reservoir simulations can integrate discrete fracture network modelling (DFNM) geomechanical properties paleo-stress, pore-pressure) as attributes for predicting the fracture network density. The table below tabulates exemplary input and output of DFNM.

| Discrete Fracture Network Model (DFNM) | |
|---|---|
| INPUT | OUTPUT (Arrays) |
| Fracture density/intensity | Fracture porosity |
| Fracture geometry (length, height) | Fracture permeability |
| Fracture aperture | Fracture Lx, Ly, Lz |
| Fracture orientation azimuth) | Fracture shape factor ($\sigma$) |
| Stress (minimum, maximum, vertical) | |
| Pore Pressure | |

FIG. 1 shows an example of a diagram 100 for identifying and ranking high-impact Discrete Fracture Network (DFN) realizations according to some implementations. In this diagram 100, the matrix property realizations are retained identical to the reference case while the Discrete Fracture Network (DFN) realizations are sampled from fracture length (FL) and fracture surface area during the phase of constructing 3D fracture plane objects conditioned to the underlying geo-mechanical drivers and paleo-stress constraints. In more detail, the process may generate N fracture model realizations by varying a number of fracture parameters (101). Examples of fracture parameters may include fracture intensity, fracture length, length/height ratio, pressure transient analysis (PTA) scaling, friction angle, aperture, and seed. Some implementations may then build histograms and cumulative density functions (cdfs) of fracture length (FL) and fracture surface area (FSA). An example of a distribution of the mean length of the fracture length (FL) for the N realizations is shown in 102A. Another example of a distribution of the mean fracture surface area (FSA) for the N realizations is shown in 102B. These implementations may then rank and identify a number of quantiles, for example, P10 (10%), P50 (50%), and P90 (90%) from the FL and FSA cdfs, as respectively illustrated in 103A and 103B. In this example, the process may then combine the nine (3 by 3) scenarios from FL and FSA ranked quantiles (104).

The process may also generate M matrix model realizations for the geological model by varying a number of model parameters (111). Examples of model parameters may include: porosity (PORO) variogram per zone, porosity-permeability (PORO-PERM) correlation, TAR variogram, and seed. TAR is very similar to bitumen, a black viscous mixture of hydrocarbons. The terms may be used interchangeably. TAR is one of the most viscous fluids and can at certain reservoir conditions represent itself as a solid. For modeling purposes, TAR can represent an impermeable barrier for fluids. Hence, TAR distributions are usually modelled with separate spatial attributes (e.g., TAR variogram) that can significantly impact spatial connectivity in the model. The seed may refer to an initial value to start a statistic simulation. The process may then build a histogram and cumulative density function of the HCPV (Hydrocarbon Pore Volume), which refers to an intra-granular volume in the porous rock occupied by hydrocarbons (oil/gas). An example of a histogram of HCPV for the M matrix realizations is shown in 112. The process may then rank and identify a number of quantiles, for example, P10 (10%), P25 (25%), P50 (50%), P75 (75%), and P90 (90%) from the HCPV cdf (cumulative distribution function). A ranking illustration is shown in 113. The process may then combine 45 (3 by 3 by 5) scenarios from the FL, FSA, and matrix quantile realizations, as shown in 114.

Figure 2A:
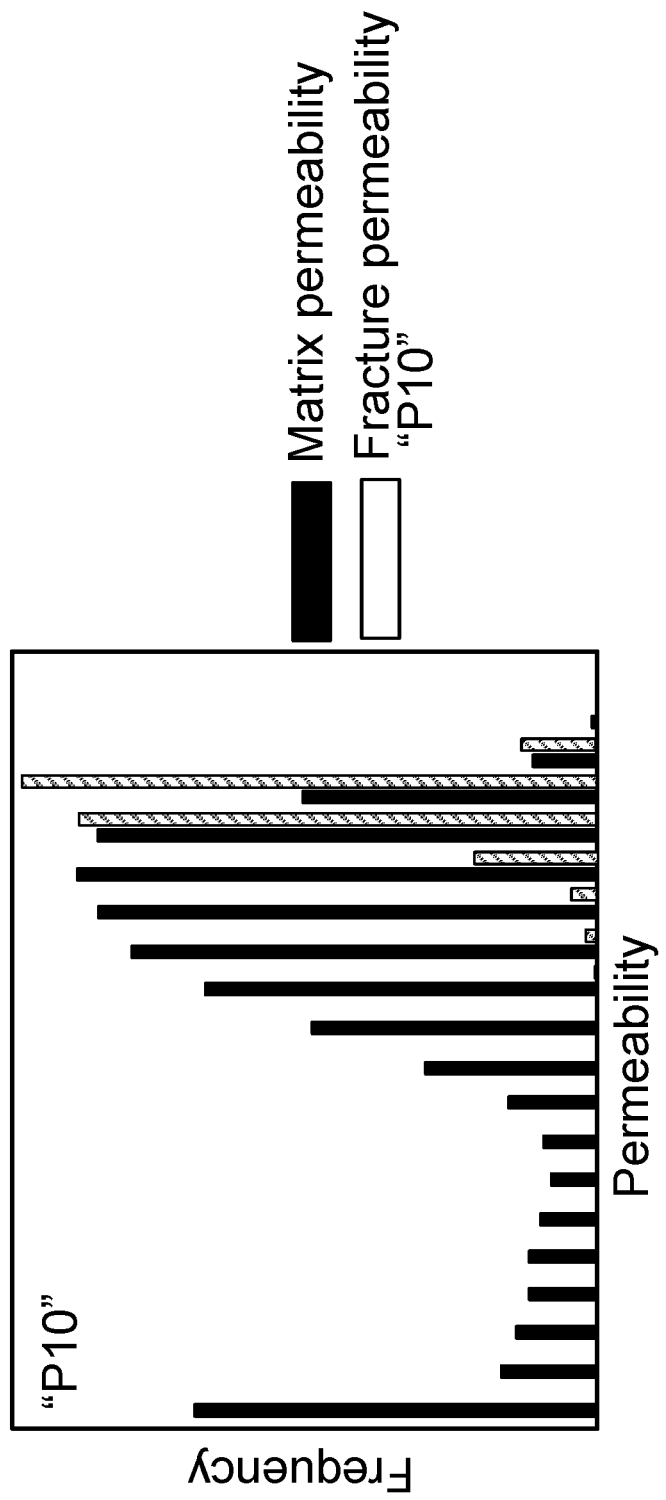
FIGS. 2A to 2C illustrate examples of classifying effective fracture permeability relative to matrix permeability for three studied scenarios of DFN realizations according to an implementation of the present disclosure.
Figure 2B:
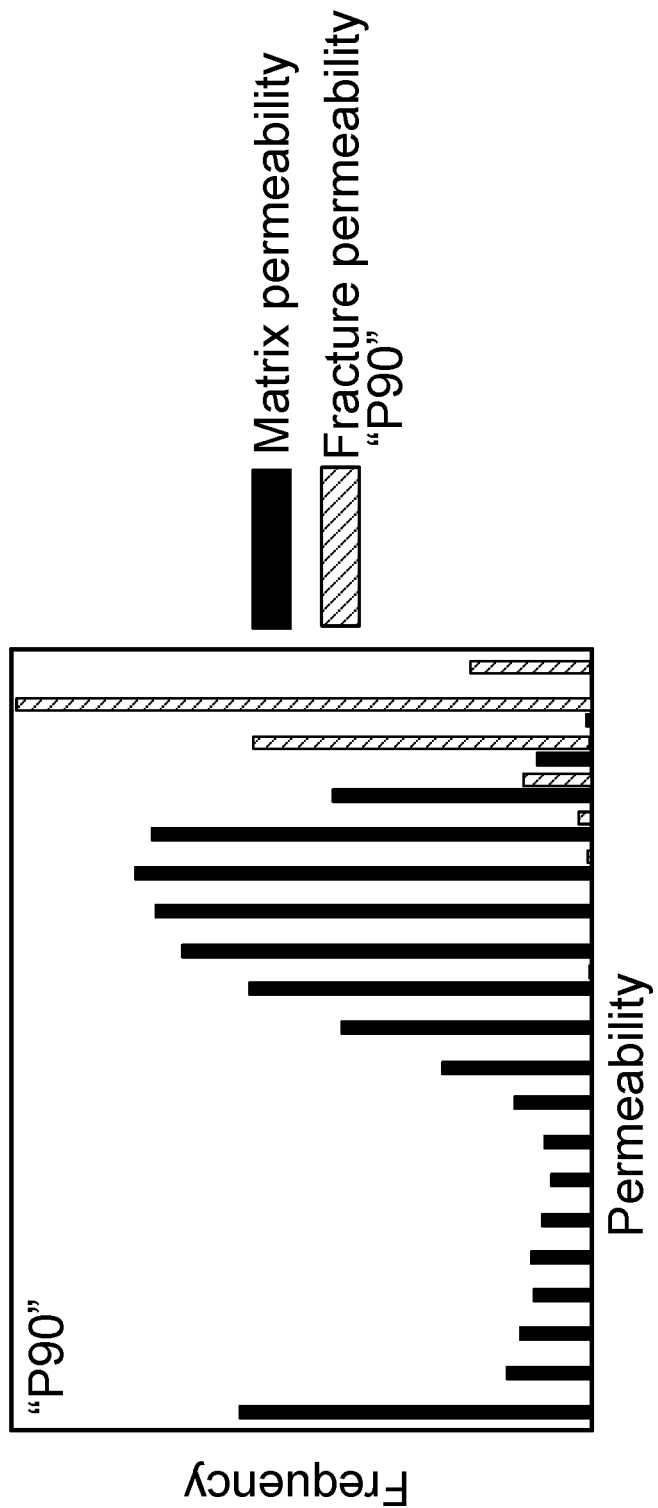
Figure 2C:
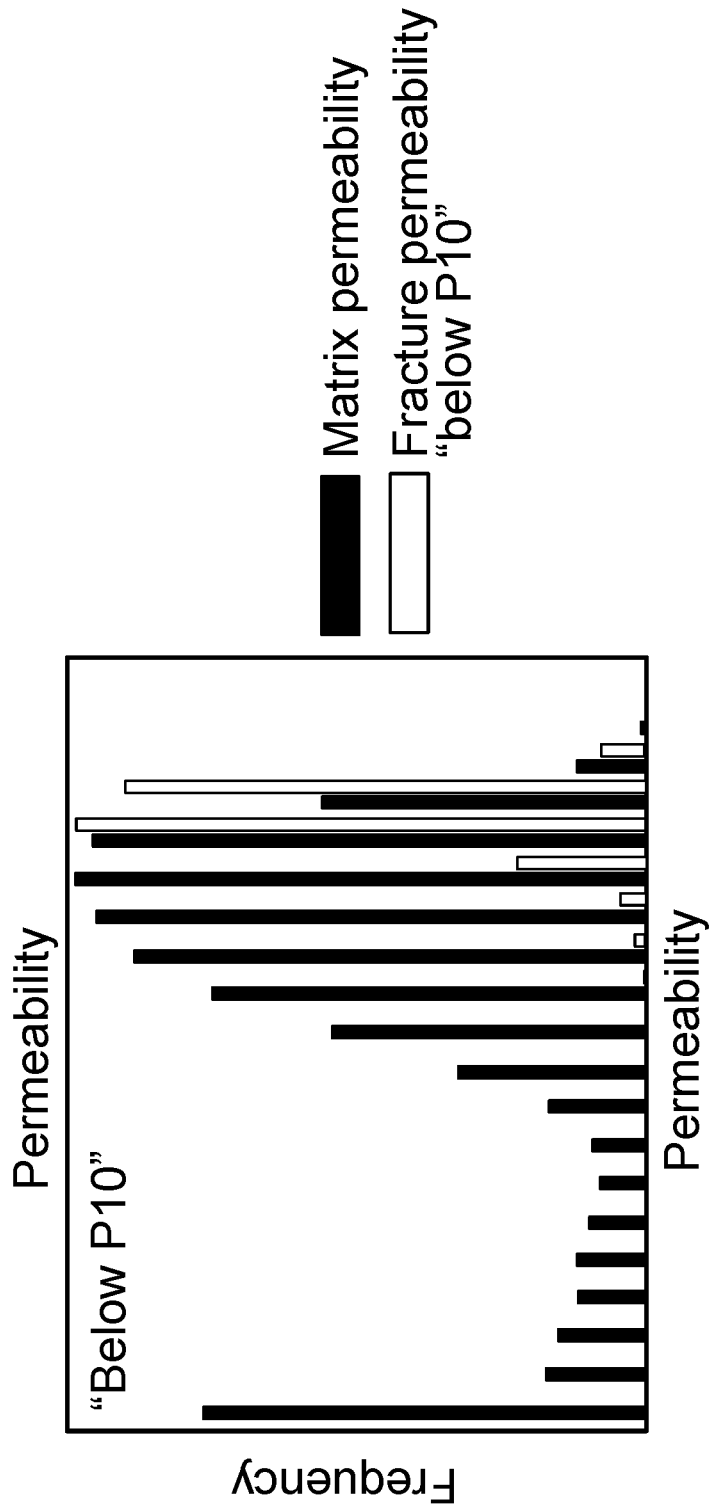

FIGS. 2A to 2B illustrate an example of classifying effective fracture permeability relative to matrix permeability for three studied scenarios of DFN realizations according to an implementation of the present disclosure. In particular, FIG. 2A to 2B respectively outline the classification of effective fracture permeability relative to matrix permeability for three studied scenarios of DFN realizations, namely, P10 DFN, P90 DFN and below P10 DFN (<P10). As illustrated by FIGS. 2A to 2C, the overlap in matrix permeability and fracture permeability is increased at P10 and below P10. Moreover, this increase is more pronounced below P10, indicating that the low probability region represents fracture models that are more impactful.

The implementations can generate dynamic variability of the simulation model response by sampling the extreme tails of DFN cumulative distribution function (cdf) at probability quantiles of <P10, while conventional wisdom is to use statistical and probability sampling techniques that focus on quantifying model and parameter uncertainty within P10 and P90 quantiles of cumulative distribution function (cdf). This shifted sampling focus results in the significant reduction of a misfit objective function. In some cases, the misfit objective function is defined as a joint combination of watercut and pressure misfit. Moreover, the misfit objective function can additionally factor in water rate and water production. Here, watercut refers to the ratio of water produced compared to the volume of total liquids produced.

Figure 3:
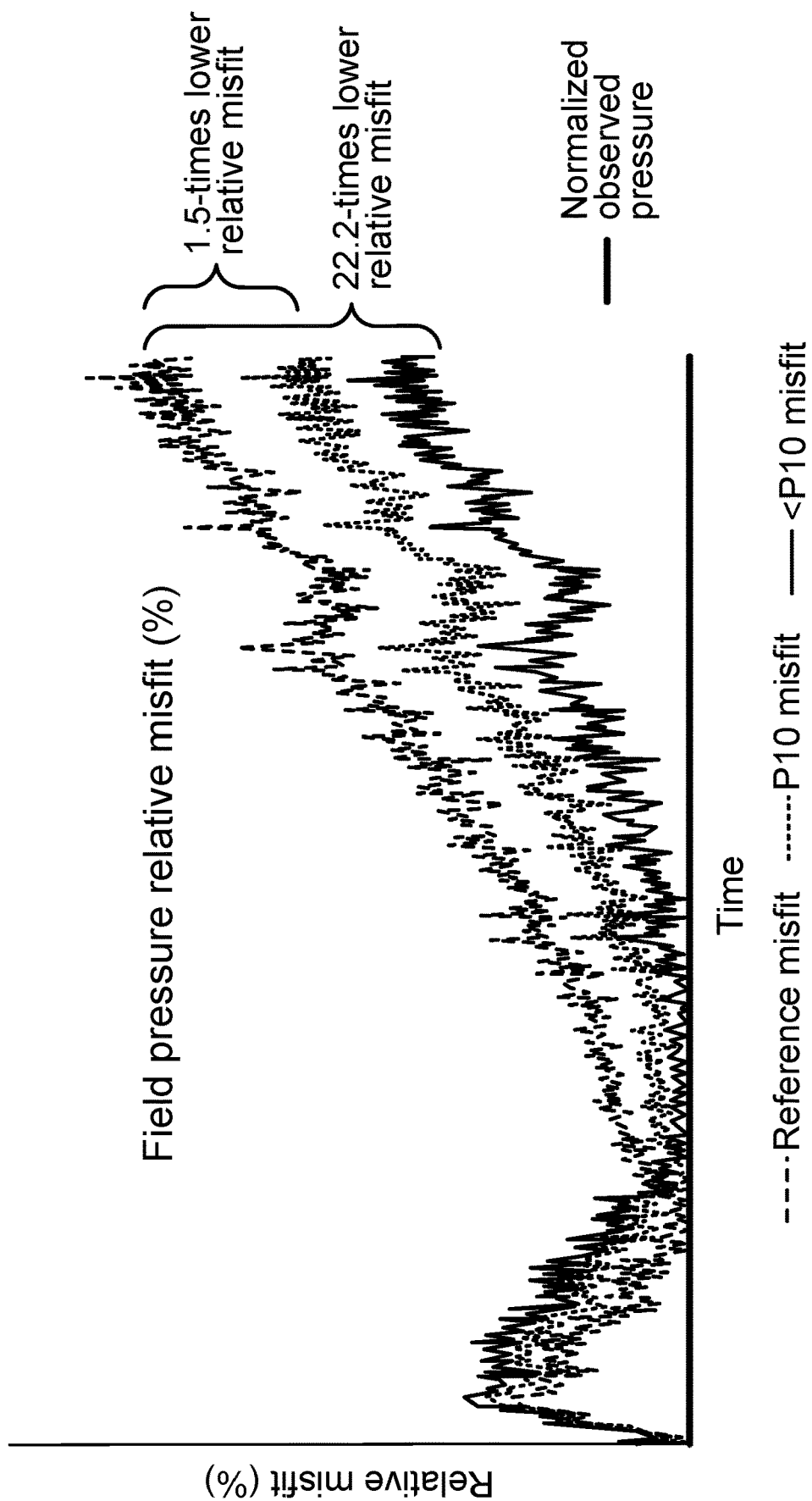
FIG. 3 illustrates examples of comparing field pressure relative misfit for three studied scenarios of DFN realizations according to an implementation of the present disclosure.

FIG. 3 illustrates examples of comparing field pressure relative misfit for the three studied scenarios of DFN realizations according to an implementation of the present disclosure. The three studied scenarios include the reference misfit (using traditional sampling), the P10 misfit (sampling the P10 percentile), and the below P10 misfit (sampling below the P10 percentile). The reference case refers to the reference P50 matrix properties and corresponding reference P50 DFNM. The P10 misfit refers to the reference (P50) matrix properties and P10 DFNM. The below P10 misfit refers to reference (P50) matrix properties and "below P10" (<P10) DFNM. Here, the illustration shows that field pressure relative misfit for the P10 case is about 1.5 times lower than the reference misfit. Additionally, field pressure relative misfit for the below P10 case is about 2.2 times lower than the reference misfit. FIG. 3 thus indicates that sampling the extreme end of the cdf, namely, below P10, further reduces field pressure misfit by about 45%, when compared to a traditional sampling quantile of, for example, P10.

Figure 4:
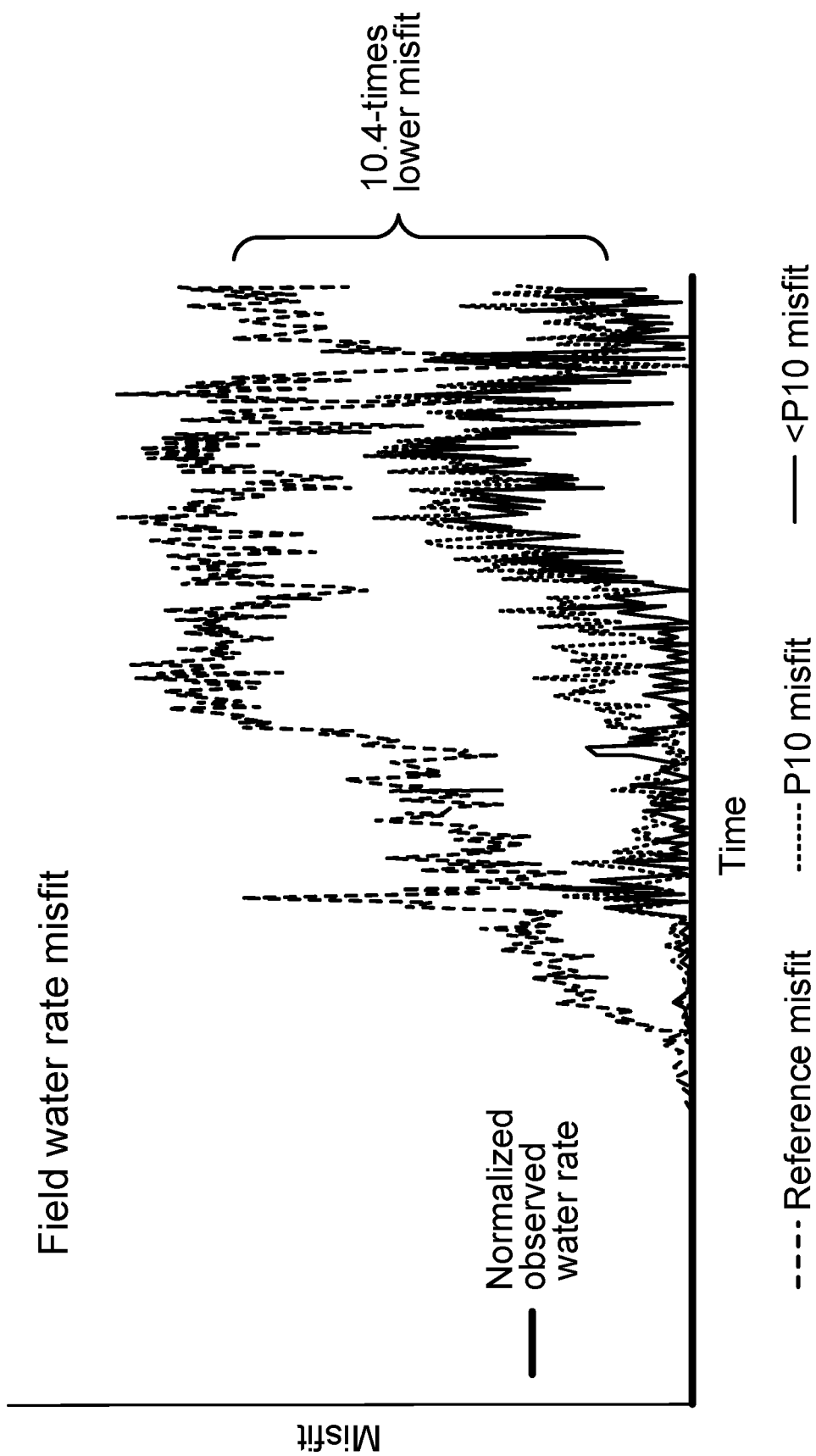
FIG. 4 illustrates examples of comparing water production rate misfit for three studied scenarios of DFN realizations according to an implementation of the present disclosure.

FIG. 4 illustrates examples of comparing water production rate misfit for three studied scenarios of DFN realizations according to an implementation of the present disclosure. As illustrated, water production relative misfit for the below P10 case is about 10.4 times lower than the reference misfit. Similarly, the water production rate relative misfit for the P10 case is better than the reference misfit but higher than the below P10 case.

Figure 5:
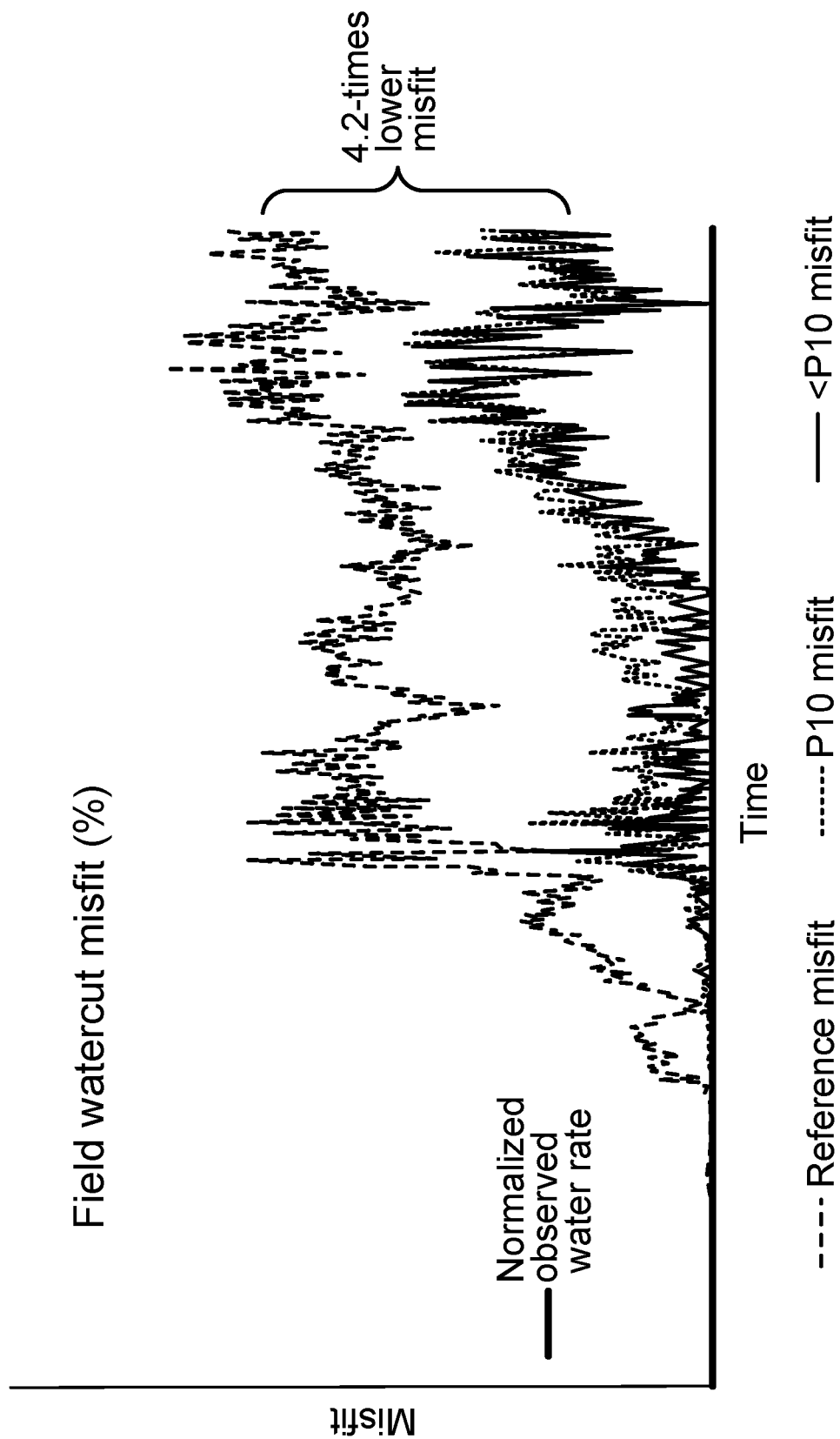
FIG. 5 illustrates examples of comparing field water cut misfit for three studied scenarios of DFN realizations according to an implementation of the present disclosure.

FIG. 5 illustrates examples of comparing field water cut misfit for three studied scenarios of DFN realizations according to an implementation of the present disclosure. As illustrated, field water cut relative misfit for the below P10 case is about 4.2 times lower than the reference misfit. Similarly, the field watercut relative misfit for the P10 case is better than the reference misfit but higher than the below P10 case.

Figure 6:
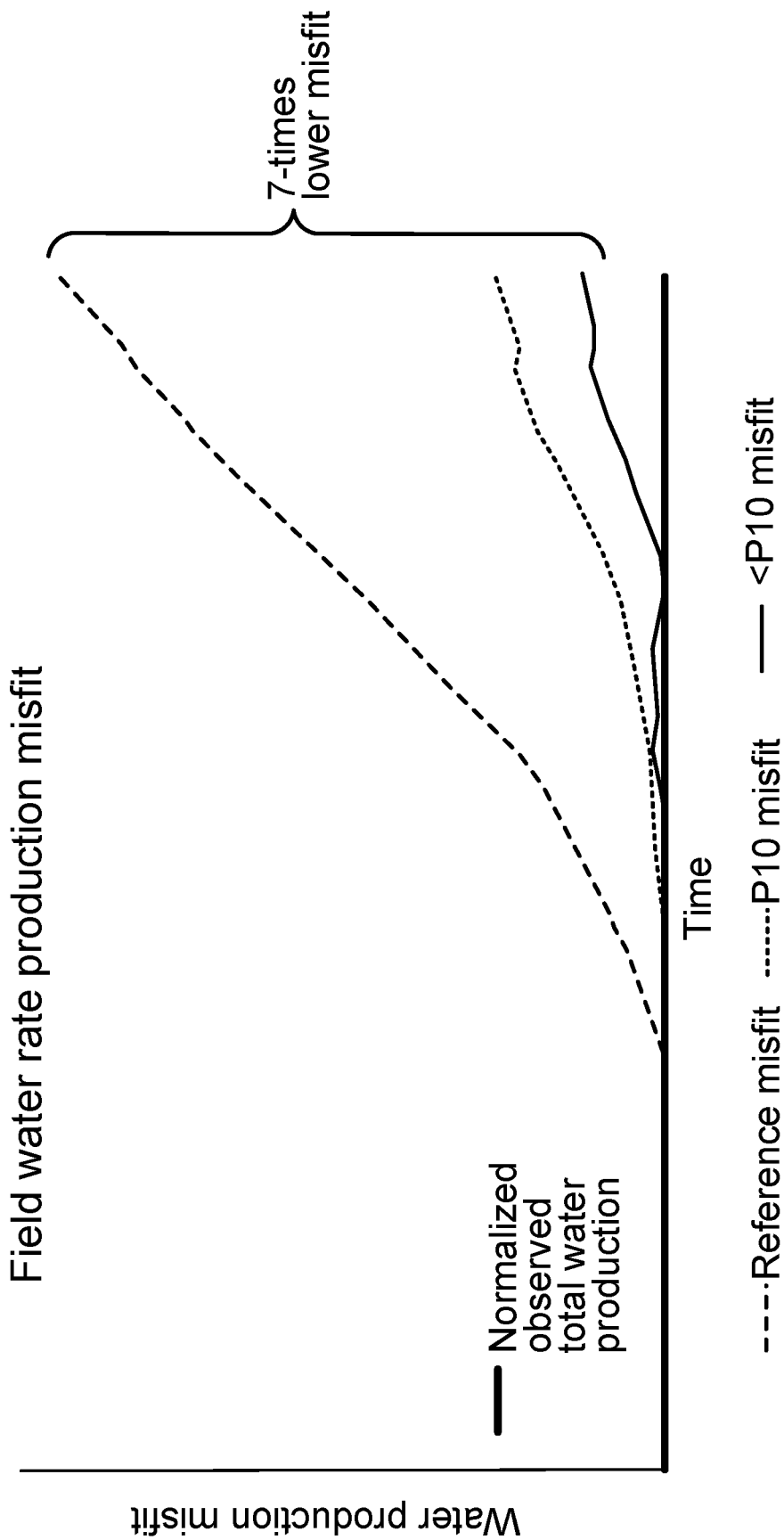
FIG. 6 illustrates examples of comparing field water total production misfit for three studied scenarios of DFN realizations according to an implementation of the present disclosure.

FIG. 6 illustrates examples of comparing field total water production misfit for three studied scenarios of DFN realizations according to an implementation of the present disclosure. As illustrated, field total water production relative misfit for the below P10 case is about 7 times lower than the reference misfit. Similarly, the field total water production relative misfit for the P10 case is better than the reference misfit but higher than the below P10 case.

In sum, the results of model dynamic variability as presented in FIGS. 3-6 indicate that the shifted focus to the extreme tails of DFN uncertainty space can significantly reduce the misfit in the field pressure and water production. This reduced misfit can results in significantly improved quality of the initial (basecase) model in terms of dynamic response and modelled reservoir connectivity. Such improvement can significantly reduce the burden of model reconciliation or history matching, resulting in better convergence and reduced history match time. Indeed implementations can deliver dynamically calibrated model with higher accuracy and geological consistency, shorten history-matching process, and yield a simulation model with more robust and reliable predictability for production forecasting.

Figure 7:
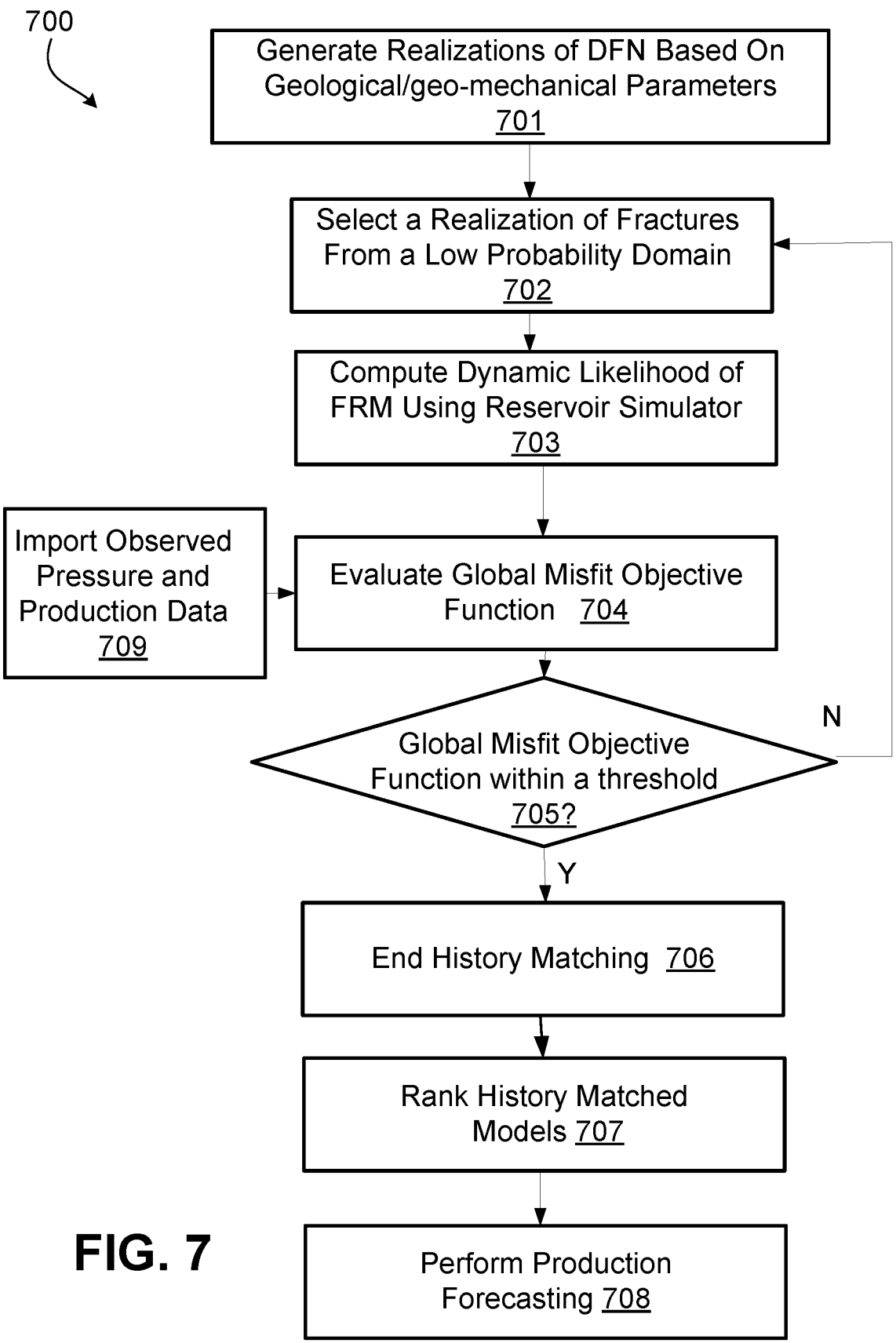
FIG. 7 illustrates an example of a flow chart according to an implementation of the present disclosure.

Various implementations can leverage the extreme tails of DFN uncertainty space when generating new stochastic DFN realizations. The extreme tails of DFN uncertainty space can be explored by, for example, identifying the low-probability and high-impact model realizations by sampling the <P10 domain of the cdf. FIG. 7 illustrates an example of a flow chart 700 according to an implementation of the present disclosure.

Process 701 may receive a seismic dataset of a surveyed subsurface of a reservoir under investigation. The seismic dataset can include observed pressure and production data of the reservoir as well as a set of geological and geo-mechanical parameters representing physical features of the surveyed subsurface. The product data here can include water rate data, water production data, and water cut data.

The process 700 may generate realizations of the discrete fracture network (DFN) based on the set of geological and geo-mechanical parameters (701). Some implementations may incorporate a 3D porosity model and geo-mechanical facies logs from the seismic dataset received. The implementations may perform rock brittleness classification, and define a stress regime model. The implementations may further define geo-mechanical fracture drivers and performs a critical stress analysis. Once these modeling steps are performed, the implementations can generate the DFN objects with 3D geometric properties, such as length, density, aperture, and orientation properties. More details of the methods and techniques are described in U.S. patent application Ser. No. 16/351,233, filed on Mar. 12, 2019, which is now incorporated in its entirety in this disclosure by reference.

The process 700 may then select a realization of DFN fractures from a low probability domain (702). For example, the selected realization is based on, at least in part, a parameter having a parameter value from a 10% quantile of a full range of likely values for the parameter. As described above, the implementations shift focus to sampling the extreme ends of DFN probability distributions and identifying low-probability but high-impact models, although traditional statistical and probability sampling techniques focus on quantifying model and parameter uncertainty within P10 and P90 quantiles of cumulative distribution function (cdf). In particular, by exploring the low probability domain (for example, below P10), the implementations can identify low-probability but high-impact stochastic DFN realizations that significantly affect the dynamic behavior of the reservoir simulation model. As described above, fracture density and fracture permeability can represent the more impactful parameters to control fluid propagation in dual porosity-dual permeability (DPDP); and differences between DFN and model parameterization of fracture density can significantly impact fracture-dominated reservoir connectivity and as such fluid dynamics (e.g. water breakthrough and fractional flow amplitude).

By way of illustration, geometric dimensions (for example, length, length/height ratio, aperture, etc.) of the model and spatial distribution of fracture planes can be accurately conditioned with underlying porosity distribution, paleo stress orientation and rock properties (e.g. brittleness). In some implementations, the fracture permeability can be accurately calibrated with fracture aperture. The parameters involved in DFN are modelled statistically with underlying distributions and as such incorporating a rigorous uncertainty quantification, which allows multiple realizations of DFN to be generated and the exploration of the low probability domain.

The process 700 may then compute the dynamic likelihood of fracture reservoir modeling (FRM) using a reservoir simulator (703). As explained in more detail in U.S. patent application Ser. No. 16/351,233, filed on Mar. 12, 2019, which is now incorporated in its entirety in this disclosure by reference, the computation can be performed as a forward simulation using methods and techniques well known in the art, notwithstanding variations due to different implementations of model building syntax, (for example, pertaining to a specific forward simulator).

The process 700 may then evaluate a global misfit objective function (OF) (704). In some implemetations, the evaluation is subject to minimization in the AHM optimization study in a least-square term:

$$Q = (1-\mu)Q^{Likelihood} + \mu Q^{Prior} \quad (1)$$

where the term "prior" corresponds to the prior geo-model realization and the term "likelihood", corresponds to the validation of the prior term, using forward reservoir simulation.

The prior term of the objective function Q is usually defined on the large-scale, fine-resolution, geo-cellular grid of the 3D geo-model (with e.g. tens or hundreds of millions of grid cells), while the likelihood term is evaluated at control points of the measured/observed data, which are usually represented by the wells (producers, injectors), which, even in most complex cases, are measured in the order of (several) thousands).

The evaluation may import observed pressure and production data (709). In some implementations, the observed pressure and production data can be included in the seismic dataset initially received. More details of the evaluation can be found in U.S. patent application Ser. No. 16/351,233, filed on Mar. 12, 2019, which is now incorporated in its entirety in this disclosure by reference.

The process 700 may then determine whether the global misfit OF is within a threshold (705). When significant reduction or minimization of global objective function is achieved (for example, when the global misfit is reduced to below the threshold), the process 700 may end the history matching process (706). The process 700 may rank the history matched models based on the global misfit objective function (707). In this case, the selected model components are propagated and installed to perform production forecasting (708). The model based the model components can be a 3D model for the reservoir.

When the threshold is not met, the process 700 may revert to select a new realization of fractures from the low probability domain, for example, below P10 (702) and further proceed to re-evaluate the global misfit objective function. In this iterative manner, new realizations of the DFN fractures may be explored. Additionally or alternatively, process 700 may revert to generating realizations of DFN objects based on revised geological/geo-mechanical properties (701).

Indeed, percentile/quantile definitions (i.e. including extreme P-values for P<10) for all the natural fracture variables in these implementations are parametrized based on the expected geological variability. The process can enforce that the friction angle does not extend beyond the certain physical ranges of values, which gives a better control over generated representations of fracture density. Implementations thus integrate dynamic calibration process where, for example, flow capacity values from the well test experiments are involved in order to minimize the error between the predicted flow capacity model and observed flow capacity point at well level. This renders more accurate definition of sampled probabilistic percentiles/quantiles (i.e. including extreme P-values for P<10) and dynamic simulation model ranking. Moreover, implementations can deliver more geologically consistent and accurate realization of the initial basecase geological (i.e. including DFN realizations sampled from extreme P-values for P<10) model for more efficient dynamic calibration and reconciliation.

Figure 8:
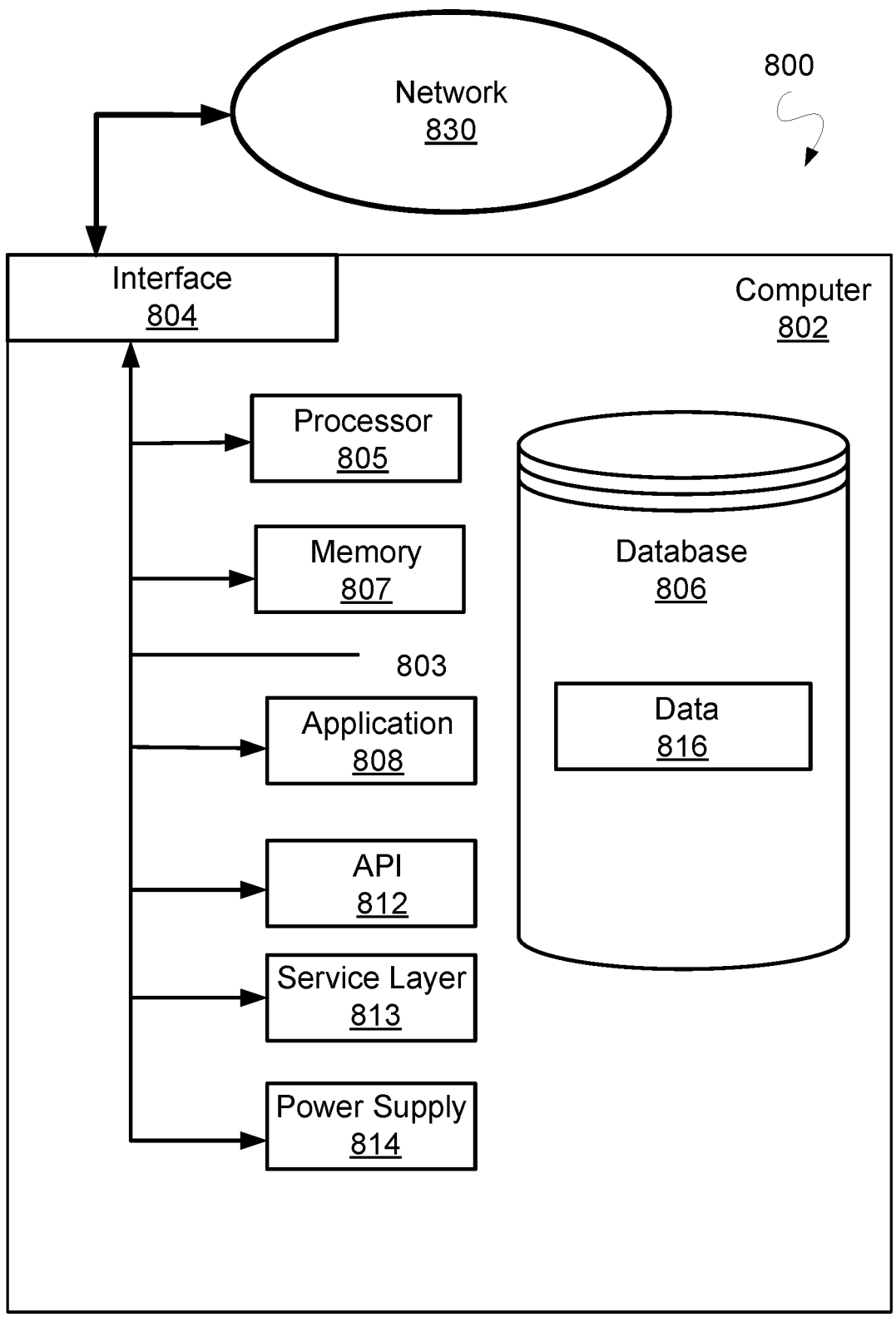
FIG. 8 is a block diagram illustrating an example of a computer system used to provide computational functionalities associated with described algorithms, methods, functions, processes, flows, and procedures, according to an implementation of the present disclosure.

FIG. 8 is a block diagram illustrating an example of a computer system 800 used to provide computational functionalities associated with described algorithms, methods, functions, processes, flows, and procedures, according to an implementation of the present disclosure. The illustrated computer 802 is intended to encompass any computing device such as a server, desktop computer, laptop/notebook computer, wireless data port, smart phone, personal data assistant (PDA), tablet computing device, one or more processors within these devices, another computing device, or a combination of computing devices, including physical or virtual instances of the computing device, or a combination of physical or virtual instances of the computing device. Additionally, the computer 802 can comprise a computer that includes an input device, such as a keypad, keyboard, touch screen, another input device, or a combination of input devices that can accept user information, and an output device that conveys information associated with the operation of the computer 802, including digital data, visual, audio, another type of information, or a combination of types of information, on a graphical-type user interface (UI) (or GUI) or other UI.

The computer 802 can serve in a role in a computer system as a client, network component, a server, a database or another persistency, another role, or a combination of roles for performing the subject matter described in the present disclosure. The illustrated computer 802 is communicably coupled with a network 830. In some implementations, one or more components of the computer 802 can be configured to operate within an environment, including cloud-computing-based, local, global, another environment, or a combination of environments.

The computer 802 is an electronic computing device operable to receive, transmit, process, store, or manage data and information associated with the described subject matter. According to some implementations, the computer 802 can also include or be communicably coupled with a server, including an application server, e-mail server, web server, caching server, streaming data server, another server, or a combination of servers.

The computer 802 can receive requests over network 830 (for example, from a client software application executing on another computer 802) and respond to the received requests by processing the received requests using a software application or a combination of software applications. In addition, requests can also be sent to the computer 802 from internal users, external or third-parties, or other entities, individuals, systems, or computers.

Each of the components of the computer 802 can communicate using a system bus 803. In some implementations, any or all of the components of the computer 802, including hardware, software, or a combination of hardware and software, can interface over the system bus 803 using an application programming interface (API) 812, a service layer 813, or a combination of the API 812 and service layer 813. The API 812 can include specifications for routines, data structures, and object classes. The API 812 can be either computer-language independent or dependent and refer to a complete interface, a single function, or even a set of APIs. The service layer 813 provides software services to the computer 802 or other components (whether illustrated or not) that are communicably coupled to the computer 802. The functionality of the computer 802 can be accessible for all service consumers using this service layer. Software services, such as those provided by the service layer 813, provide reusable, defined functionalities through a defined interface. For example, the interface can be software written in JAVA, C++, another computing language, or a combination of computing languages providing data in extensible markup language (XML) format, another format, or a combination of formats. While illustrated as an integrated component of the computer 802, alternative implementations can illustrate the API 812 or the service layer 813 as stand-alone components in relation to other components of the computer 802 or other components (whether illustrated or not) that are communicably coupled to the computer 802. Moreover, any or all parts of the API 812 or the service layer 813 can be implemented as a child or a sub-module of another software module, enterprise application, or hardware module without departing from the scope of the present disclosure.

The computer 802 includes an interface 804. Although illustrated as a single interface 804 in FIG. 8, two or more interfaces 804 can be used according to particular needs, desires, or particular implementations of the computer 802. The interface 804 is used by the computer 802 for communicating with another computing system (whether illustrated or not) that is communicatively linked to the network 830 in a distributed environment. Generally, the interface 804 is operable to communicate with the network 830 and comprises logic encoded in software, hardware, or a combination of software and hardware. More specifically, the interface 804 can comprise software supporting one or more communication protocols associated with communications such that the network 830 or interface's hardware is operable to communicate physical signals within and outside of the illustrated computer 802.

The computer 802 includes a processor 805. Although illustrated as a single processor 805 in FIG. 8, two or more processors can be used according to particular needs, desires, or particular implementations of the computer 802. Generally, the processor 805 executes instructions and manipulates data to perform the operations of the computer 802 and any algorithms, methods, functions, processes, flows, and procedures as described in the present disclosure.

The computer 802 also includes a database 804 that can hold data for the computer 802, another component communicatively linked to the network 830 (whether illustrated or not), or a combination of the computer 802 and another component. For example, database 806 can be an in-memory, conventional, or another type of database storing data consistent with the present disclosure. In some implementations, database 806 can be a combination of two or more different database types (for example, a hybrid in-memory and conventional database) according to particular needs, desires, or particular implementations of the computer 802 and the described functionality. Although illustrated as a single database 806 in FIG. 8, two or more databases of similar or differing types can be used according to particular needs, desires, or particular implementations of the computer 802 and the described functionality. While database 806 is illustrated as an integral component of the computer 802, in alternative implementations, database 806 can be external to the computer 802. As illustrated, the database 806 holds the previously described data 816 including, for example, a database storing seismic data, model definitions, and history matches.

The computer 802 also includes a memory 807 that can hold data for the computer 802, another component or components communicatively linked to the network 830 (whether illustrated or not), or a combination of the computer 802 and another component. Memory 807 can store any data consistent with the present disclosure. In some implementations, memory 807 can be a combination of two or more different types of memory (for example, a combination of semiconductor and magnetic storage) according to particular needs, desires, or particular implementations of the computer 802 and the described functionality. Although illustrated as a single memory 807 in FIG. 8, two or more memories 807 or similar or differing types can be used according to particular needs, desires, or particular implementations of the computer 802 and the described functionality. While memory 807 is illustrated as an integral component of the computer 802, in alternative implementations, memory 807 can be external to the computer 802.

The application 808 is an algorithmic software engine providing functionality according to particular needs, desires, or particular implementations of the computer 802, particularly with respect to functionality described in the present disclosure. For example, application 808 can serve as one or more components, modules, or applications. Further, although illustrated as a single application 808, the application 808 can be implemented as multiple applications 808 on the computer 802. In addition, although illustrated as integral to the computer 802, in alternative implementations, the application 808 can be external to the computer 802.

The computer 802 can also include a power supply 814. The power supply 814 can include a rechargeable or non-rechargeable battery that can be configured to be either user- or non-user-replaceable. In some implementations, the power supply 814 can include power-conversion or management circuits (including recharging, standby, or another power management functionality). In some implementations, the power-supply 814 can include a power plug to allow the computer 802 to be plugged into a wall socket or another power source to, for example, power the computer 802 or recharge a rechargeable battery.

There can be any number of computers 802 associated with, or external to, a computer system containing computer 802, each computer 802 communicating over network 830. Further, the term "client," "user," or other appropriate terminology can be used interchangeably, as appropriate, without departing from the scope of the present disclosure. Moreover, the present disclosure contemplates that many users can use one computer 802, or that one user can use multiple computers 802.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs, that is, one or more modules of computer program instructions encoded on a tangible, non-transitory, computer-readable computer-storage medium for execution by, or to control the operation of, data processing apparatus. Alternatively, or additionally, the program instructions can be encoded in/on an artificially generated propagated signal, for example, a machine-generated electrical, optical, or electromagnetic signal that is generated to encode information for transmission to a receiver apparatus for execution by a data processing apparatus. The computer-storage medium can be a machine-readable storage device, a machine-readable storage substrate, a random or serial access memory device, or a combination of computer-storage mediums. Configuring one or more computers means that the one or more computers have installed hardware, firmware, or software (or combinations of hardware, firmware, and software) so that when the software is executed by the one or more computers, particular computing operations are performed.

The term "real-time," "real time," "realtime," "real (fast) time (RFT)," "near(ly) real-time (NRT)," "quasi real-time," or similar terms (as understood by one of ordinary skill in the art), means that an action and a response are temporally proximate such that an individual perceives the action and the response occurring substantially simultaneously. For example, the time difference for a response to display (or for an initiation of a display) of data following the individual's action to access the data can be less than 1 millisecond (ms), less than 1 second (s), or less than 5 s. While the requested data need not be displayed (or initiated for display) instantaneously, it is displayed (or initiated for display) without any intentional delay, taking into account processing limitations of a described computing system and time required to, for example, gather, accurately measure, analyze, process, store, or transmit the data.

The terms "data processing apparatus," "computer," or "electronic computer device" (or equivalent as understood by one of ordinary skill in the art) refer to data processing hardware and encompass all kinds of apparatus, devices, and machines for processing data, including by way of example, a programmable processor, a computer, or multiple processors or computers. The apparatus can also be, or further include special purpose logic circuitry, for example, a central processing unit (CPU), an FPGA (field programmable gate array), or an ASIC (application-specific integrated circuit). In some implementations, the data processing apparatus or special purpose logic circuitry (or a combination of the data processing apparatus or special purpose logic circuitry) can be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with an operating system of some type, for example LINUX, UNIX, WINDOWS, MAC OS, ANDROID, IOS, another operating system, or a combination of operating systems.

A computer program, which can also be referred to or described as a program, software, a software application, a unit, a module, a software module, a script, code, or other component can be written in any form of programming language, including compiled or interpreted languages, or declarative or procedural languages, and it can be deployed in any form, including, for example, as a stand-alone program, module, component, or subroutine, for use in a computing environment. A computer program can, but need not, correspond to a file in a file system. A program can be stored in a portion of a file that holds other programs or data, for example, one or more scripts stored in a markup language document, in a single file dedicated to the program in question, or in multiple coordinated files, for example, files that store one or more modules, sub-programs, or portions of code. A computer program can be deployed to be executed on one computer or on multiple computers that are located at one site or distributed across multiple sites and interconnected by a communication network.

While portions of the programs illustrated in the various figures can be illustrated as individual components, such as units or modules, that implement described features and functionality using various objects, methods, or other processes, the programs can instead include a number of sub-units, sub-modules, third-party services, components, libraries, and other components, as appropriate. Conversely, the features and functionality of various components can be combined into single components, as appropriate. Thresholds used to make computational determinations can be statically, dynamically, or both statically and dynamically determined.

Described methods, processes, or logic flows represent one or more examples of functionality consistent with the present disclosure and are not intended to limit the disclosure to the described or illustrated implementations, but to be accorded the widest scope consistent with described principles and features. The described methods, processes, or logic flows can be performed by one or more programmable computers executing one or more computer programs to perform functions by operating on input data and generating output data. The methods, processes, or logic flows can also be performed by, and apparatus can also be implemented as, special purpose logic circuitry, for example, a CPU, an FPGA, or an ASIC.

Computers for the execution of a computer program can be based on general or special purpose microprocessors, both, or another type of CPU. Generally, a CPU will receive instructions and data from and write to a memory. The essential elements of a computer are a CPU, for performing or executing instructions, and one or more memory devices for storing instructions and data. Generally, a computer will also include, or be operatively coupled to, receive data from or transfer data to, or both, one or more mass storage devices for storing data, for example, magnetic, magneto-optical disks, or optical disks. However, a computer need not have such devices. Moreover, a computer can be embedded in another device, for example, a mobile telephone, a personal digital assistant (PDA), a mobile audio or video player, a game console, a global positioning system (GPS) receiver, or a portable memory storage device.

Non-transitory computer-readable media for storing computer program instructions and data can include all forms of media and memory devices, magnetic devices, magneto optical disks, and optical memory device. Memory devices include semiconductor memory devices, for example, random access memory (RAM), read-only memory (ROM), phase change memory (PRAM), static random access memory (SRAM), dynamic random access memory (DRAM), erasable programmable read-only memory (EPROM), electrically erasable programmable read-only memory (EEPROM), and flash memory devices. Magnetic devices include, for example, tape, cartridges, cassettes, internal/removable disks. Optical memory devices include, for example, digital video disc (DVD), CD-ROM, DVD+/−R, DVD-RAM, DVD-ROM, HD-DVD, and BLURAY, and other optical memory technologies. The memory can store various objects or data, including caches, classes, frameworks, applications, modules, backup data, jobs, web pages, web page templates, data structures, database tables, repositories storing dynamic information, or other appropriate information including any parameters, variables, algorithms, instructions, rules, constraints, or references. Additionally, the memory can include other appropriate data, such as logs, policies, security or access data, or reporting files. The processor and the memory can be supplemented by, or incorporated in, special purpose logic circuitry.

To provide for interaction with a user, implementations of the subject matter described in this specification can be implemented on a computer having a display device, for example, a CRT (cathode ray tube), LCD (liquid crystal display), LED (Light Emitting Diode), or plasma monitor, for displaying information to the user and a keyboard and a pointing device, for example, a mouse, trackball, or trackpad by which the user can provide input to the computer. Input can also be provided to the computer using a touchscreen, such as a tablet computer surface with pressure sensitivity, a multi-touch screen using capacitive or electric sensing, or another type of touchscreen. Other types of devices can be used to interact with the user. For example, feedback provided to the user can be any form of sensory feedback. Input from the user can be received in any form, including acoustic, speech, or tactile input. In addition, a computer can interact with the user by sending documents to and receiving documents from a client computing device that is used by the user.

The term "graphical user interface," or "GUI," can be used in the singular or the plural to describe one or more graphical user interfaces and each of the displays of a particular graphical user interface. Therefore, a GUI can represent any graphical user interface, including but not limited to, a web browser, a touch screen, or a command line interface (CLI) that processes information and efficiently presents the information results to the user. In general, a GUI can include a plurality of user interface (UI) elements, some or all associated with a web browser, such as interactive fields, pull-down lists, and buttons. These and other UI elements can be related to or represent the functions of the web browser.

Implementations of the subject matter described in this specification can be implemented in a computing system that includes a back-end component, for example, as a data server, or that includes a middleware component, for example, an application server, or that includes a front-end component, for example, a client computer having a graphical user interface or a Web browser through which a user can interact with an implementation of the subject matter described in this specification, or any combination of one or more such back-end, middleware, or front-end components. The components of the system can be interconnected by any form or medium of wireline or wireless digital data communication (or a combination of data communication), for example, a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 802.11 a/b/g/n or 802.20 (or a combination of 802.11x and 802.20 or other protocols consistent with the present disclosure), all or a portion of the Internet, another communication network, or a combination of communication networks. The communication network can communicate with, for example, Internet Protocol (IP) packets, Frame Relay frames, Asynchronous Transfer Mode (ATM) cells, voice, video, data, or other information between networks addresses.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of what can be claimed, but rather as descriptions of features that can be specific to particular implementations. Certain features that are described in this specification in the context of separate implementations can also be implemented, in combination, in a single implementation. Conversely, various features that are described in the context of a single implementation can also be implemented in multiple implementations, separately, or in any sub-combination. Moreover, although previously described features can be described as acting in certain combinations and even initially claimed as such, one or more features from a claimed combination can, in some cases, be excised from the combination, and the claimed combination can be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations can be considered optional), to achieve desirable results. In certain circumstances, multitasking or parallel processing (or a combination of multitasking and parallel processing) can be advantageous and performed as deemed appropriate.

Moreover, the separation or integration of various system modules and components in the previously described implementations should not be understood as requiring such separation or integration in all implementations, and it should be understood that the described program components and systems can generally be integrated together in a single software product or packaged into multiple software products.

Furthermore, any claimed implementation is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the non-transitory, computer-readable medium.

What is claimed is:

1. A computer-implemented method to improve production forecasting accuracy for a reservoir, the computer-implemented method comprising:
   receiving a seismic dataset of a surveyed subsurface of the reservoir under investigation, the seismic dataset comprising observed pressure and production data of the reservoir as well as a set of geological and geo-mechanical parameters representing physical features of the surveyed subsurface;
   generating multiple realizations of a discrete fracture network (DFN) based on a subset of the set of geological and geo-mechanical parameters, wherein the multiple realizations are ranked in a number of quantiles, wherein each quantile represents at least one realization generated based on the subset of geological and geo-mechanical parameters with corresponding parameter values under the quantile of a full range of likely values, wherein the subset of geological and geo-mechanical parameters comprise: a fracture surface area, and a fracture length;
   selecting, from the multiple realizations, one or more realizations generated based on the subset of geological and geo-mechanical parameters with corresponding parameter values ranked under a 10% quantile of the full range of likely values;
   performing a forward simulation for the reservoir based on the selected one or more realizations and the observed pressure and production data;
   in response to determining that a misfit of the forward simulation is reduced below a threshold, producing a 3D model of the reservoir based on the forward simulation; and
   applying the 3D model to subsequently model the reservoir with improved production forecasting accuracy by virtue of the reduced misfit.

2. The computer-implemented method of claim 1, further comprising:
   performing production forecasting for the reservoir, at least in part, based on the 3D model.

3. The computer-implemented method of claim 1, wherein the misfit is computed as a combination of misfits of watercut and pressure.

4. The computer-implemented method of claim 3, wherein the misfit is computed as a combination of misfits of water rate and water production.

5. The computer-implemented method of claim 1, wherein the set of geological and geo-mechanical parameters comprise:
   a fracture orientation, fracture geometric properties and constraints, a fracture density or concentration, spatial components of paleo-stress, and an intrinsic fracture permeability model.

6. The computer-implemented method of claim 5, wherein the fracture orientation comprises variogram attributes including major, minor and vertical correlation length.

7. The computer-implemented method of claim 1, further comprising:
   in response to determining that the misfit of the forward simulation is not below the threshold, selecting a new realization that has been generated, at least in part, based on the subset of geological and geo-mechanical parameters with corresponding parameter values under a 10% quantile of the full range of likely values; and
   performing the forward simulation for the reservoir based on the selected new realization and the observed pressure and production data.

8. The computer-implemented method of claim 7, further comprising:
   computing the misfit based on the selected new realization.

9. The computer-implemented method of claim 7, further comprising:
   generating a plurality of history matched models based on iteratively selecting the realization of the DFN; and
   ranking the plurality of history matched models based on misfits computed for respective history matched models.

10. A computer system comprising one or more processors configured to improve production forecasting accuracy for a reservoir by performing operations of:
    receiving a seismic dataset of a surveyed subsurface of the reservoir under investigation, the seismic dataset comprising observed pressure and production data of the reservoir as well as a set of geological and geo-mechanical parameters representing physical features of the surveyed subsurface;
    generating multiple realizations of a discrete fracture network (DFN) based on a subset of the set of geological and geo-mechanical parameters, wherein the multiple realizations are ranked in a number of quantiles, wherein each quantile represents at least one realization generated based on the subset of geological and geo-mechanical parameters with corresponding parameter values under the quantile of a full range of likely values, wherein the subset of geological and geo-mechanical parameters comprise: a fracture surface area, and a fracture length;
    selecting, from the multiple realizations, one or more realizations generated based on the subset of geological and geo-mechanical parameters with corresponding parameter values ranked under a 10% quantile of the full range of likely values;
    performing a forward simulation for the reservoir based on the selected one or more realizations and the observed pressure and production data;
    in response to determining that a misfit of the forward simulation is reduced below a threshold, producing a 3D model of the reservoir based on the forward simulation; and
    applying the 3D model to subsequently model the reservoir with improved production forecasting accuracy by virtue of the reduced misfit.

11. The computer system of claim 10, wherein the operations further comprise:
    performing production forecasting for the reservoir, at least in part, based on the 3D model.

12. The computer system of claim 10, wherein the misfit is computed as a combination of misfits of watercut and pressure.

13. The computer system of claim 12, wherein the misfit is computed as a combination of misfits of water rate and water production.

14. The computer system of claim 10, wherein the set of geological and geo-mechanical parameters comprise:
a fracture orientation, fracture geometric properties and constraints, a fracture density or concentration, spatial components of paleo-stress, and an intrinsic fracture permeability model.

15. The computer system of claim 14, wherein the fracture orientation comprises variogram attributes including major, minor and vertical correlation length.

16. The computer system of claim 10, wherein the operations further comprise:
in response to determining that the misfit of the forward simulation is not below the threshold, selecting a new realization that has been generated, at least in part, based on the subset of geological and geo-mechanical parameters with corresponding parameter values under a 10% quantile of the full range of likely values; and
performing the forward simulation for the reservoir based on the selected new realization and the observed pressure and production data.

17. The computer system claim 16, wherein the operations further comprise:
computing the misfit based on the selected new realization.

18. The computer system of claim 16, wherein the operations further comprise:
generating a plurality of history matched models based on iteratively selecting the realization of the DFN; and
ranking the plurality of history matched models based on misfits computed for respective history matched models.

\* \* \* \* \*